United States Patent [19]

Heiser et al.

[11] 4,072,169

[45] Feb. 7, 1978

[54] HYDRAULIC CONTROL SYSTEM

[75] Inventors: Joachim Heiser, Stuttgart; Rainer Hoheisel, Aldingen; Heinz Flaschar, Asperg; Heinz Gand; Heinz Kleinschmidt, both of Stuttgart; Konrad Bräunlinger, Schwieberdingen; Klaus Sopha, Stuttgart; Roland Schempp, Abstatt; Hermann Sanzenbacher, Heimsheim, all of Germany

[73] Assignee: Robert Bosch GmbH, Stuttgart, Germany

[21] Appl. No.: 702,860

[22] Filed: July 6, 1976

[30] Foreign Application Priority Data

July 29, 1975 Germany ............................ 2533829

[51] Int. Cl.$^2$ ..................... F15B 13/043; F16K 11/07

[52] U.S. Cl. ................................ 137/596.13; 91/461; 137/625.64

[58] Field of Search ....................... 137/596.13, 596.16, 137/625.64; 91/461

[56] References Cited

U.S. PATENT DOCUMENTS

| | | | |
|---|---|---|---|
| 3,176,954 | 4/1965 | Cameron | 137/596.16 X |
| 3,556,154 | 1/1971 | Kramer | 137/625.64 |
| 3,628,567 | 12/1971 | Bender | 137/596.13 |
| 3,744,374 | 7/1973 | Schneider | 91/461 X |
| 3,768,375 | 10/1973 | Flaschar | 91/461 X |

*Primary Examiner*—Robert G. Nilson
*Attorney, Agent, or Firm*—Michael J. Striker

[57] ABSTRACT

A hydraulic control system has a three-position valve which in its central position disconnects the high-pressure and low-pressure sides of a pressure source from outlet lines but connects these sides of the source together through a low-pressure valve. Moved to either of its end positions the valve is disconnected from between the sides of the pressure source and the output lines are connected to the high-pressure and low-pressure source sides. A pressure-limiting valve is connected between the sides of the source. In addition, the high-pressure side is connected via pressure-reducing valve and a restriction to a pair of pilot valves which are in turn connected to the low-pressure side. These pilot valves are also connected to opposite chambers of a pilot cylinder that controls the valve body. The pressure-reducing valve between the pilot valves and the high-pressure side maintains a medium-pressure level in the system when the valves move from its central position.

7 Claims, 2 Drawing Figures

HYDRAULIC CONTROL SYSTEM

BACKGROUND OF THE INVENTION

The present invention relates to a hydraulic control system. More particularly this invention concerns an electro-hydraulic arrangement for connecting a source of fluid under pressure to a load.

Commonly assigned U.S. Pat. Nos. 3,768,375 and 3,744,374 describe hydraulic systems related to those of the present invention.

A hydraulic control system is known wherein the high-pressure and low-pressure sides of a source of fluid under pressure, e.g. a pump, are connectable through a three-position main valve to a pair of output lines which may, for instance, be connected to opposite chambers of a double-acting cylinder. In one end position of the valve body the one output line is connected to the high-pressure side and the other to the low-pressure side and in the opposite end position the lines are reversed. In the middle position the lines are disconnected from the source of fluid under pressure and, instead, a shunt line is connected between the high-pressure and low-pressure sides to unload the pump. Upstream of the main control valve between it and the high pressure side of the source there is connected a pressure-reducing valve whose output is connected to control valves to the low-pressure side of the source. These control valves operate opposite chambers in a double-acting cylinder that is connected to the valve body and, therefore, serve to operate the main valve. Normally the main valve is carried on a single plate and there is provided on another plate an accumulator which is pressurized through a pressure-reducing valve. The control arrangement including the above-mentioned pilot valves contains a solenoid valve which, when the system has not connected the main valve in either of its end positions, cuts the accumulator off from the source of fluid under pressure.

In such an arrangement the pump frequently operates against a considerable load. Furthermore, the third valve in the control arrangement, through which a constant small flow takes place, frequently clogs up when the oil becomes dirty so that the system fails to operate altogether. In addition, the provision of this third valve and the accumulator complicates the device to make it more failure prone and increases its cost.

SUMMARY OF THE INVENTION

It is therefore an object of the present invention to provide an improved hydraulic control system.

Another object is the provision of a system of the above-described general type which overcomes the above-given disadvantages.

These objects are attained according to the present invention by connecting the pilot valves directly, without interposition of an accumulator, with the pressure-reducing valve. Furthermore, the shunt line that is connected between the high-pressure and low-pressure sides of the source is provided with a one-way low-pressure reducing valve which maintains between its input and output a pressure differential which is lower than the medium pressure differential maintained across the other pressure reducing valve.

This arrangement makes the above-described accumulator and third control valve unnecessary, so that production costs are reduced and the system is made less complex and failure-prone. The position of the relatively simple low-pressure reducing valve in the shunt line insures that enough pressure is maintained in the system when it is in standby condition, that is when the main valve is in the middle position, to insure operation of the pilot valves, while at the same time the load opposing the pump of the source of the fluid is relatively small.

In accordance with further features of the invention there is provided between the control arrangement constituted by a pair of pilot valves and the medium-pressure valve, a restriction. Thus, when a plurality of such main valves is connected in parallel the pressure drop caused by the operation of any one of the valves is minimized.

In accordance with another feature of this invention, a cutoff valve is provided between the medium-pressure valve and the pilot valves so as to cut off the medium-pressure valve from the control valve in the standby condition of the apparatus.

The main valve in accordance with this invention is operated by a double-acting pilot cylinder having a differential piston whose larger face is connectable through one of the pilot valves to the low-pressure side and through the other pilot valve to the outlet of the medium-pressure valve. The smaller piston face is always connected to the outlet of the medium-pressure valve. Thus opening one of the valves will equally pressurize both chambers and cause the piston to move in one direction as a result of the greater force exerted on the larger face and opening of the other valve only will cause the piston to move in the opposite direction due to de-pressurization of the larger-face chamber.

According to yet another feature of this invention there is provided between the high-pressure side and the low-pressure side of the source a high-pressure relief valve which serves mainly to protect the pump from being overloaded when the valve body is in either of its end positions. A cutout valve connected to this high-pressure relief valve is effective with the valve in the middle position to cut off this high-pressure valve, but is ineffective in the other two positions so as to allow operation of this high-pressure valve. Thus, in the system according to the present invention the pump produces the highest pressure at its high-pressure side, this pressure automatically being reduced to relatively high pressure by the high-pressure valve. The pressure is reduced again to the medium pressure by the medium-pressure valve and used to operate the pilot piston that controls the main valve body. Furthermore, the low-pressure reducing valve is effective in the central position of the main valve to maintain a relatively low pressure in the system to unload the pump while still leaving the system sufficiently pressurized to operate the pilot piston controlling the main valve. The lowest pressure in the system is at the low-pressure side and this pressure is substantially equal to zero.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawings.

DESCRIPTION OF THE PREFERRED EMBODIMENTS

Figure 1:
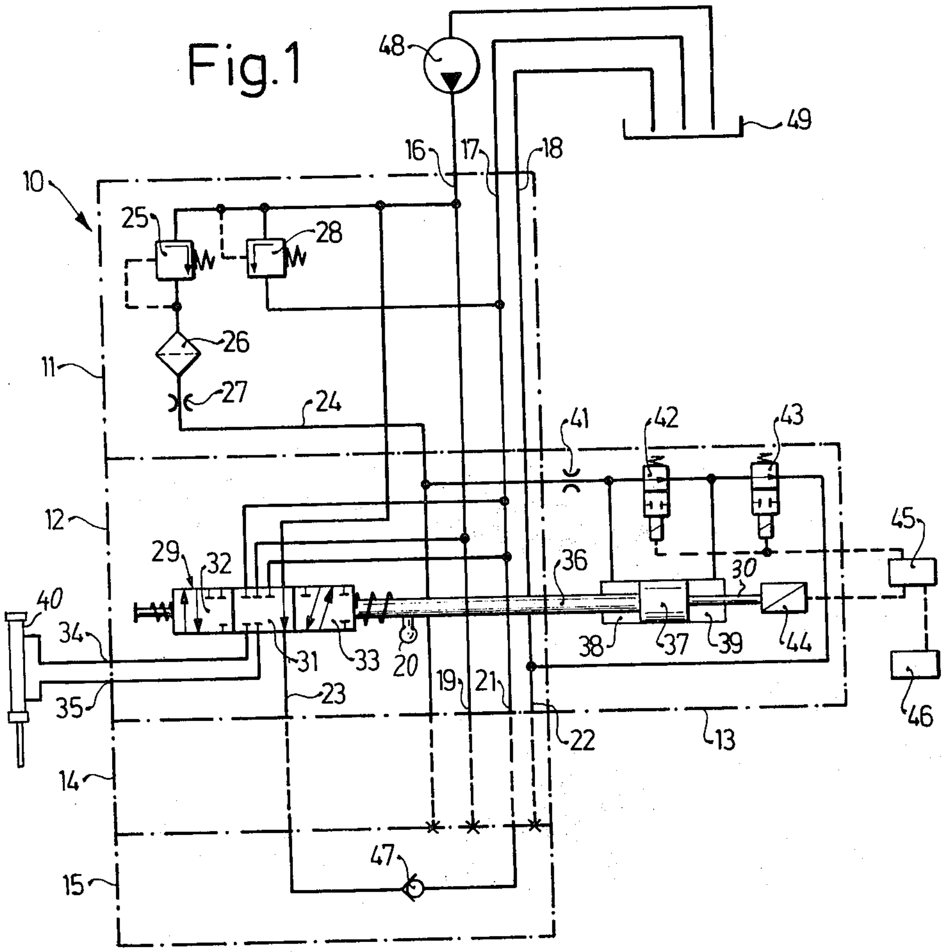
FIG. 1 is a schematic view of the system according to the present invention.

As is shown in FIG. 1, an electro-hydraulic control arrangement 10 has a connection plate 11 onto which is bolted a valve plate 12 and a pilot valve plate 13. To the other side of the plates 12 and 13 may be bolted another plate 14 identical to the plates 12 and 13 and at the far end there is provided an end plate 15.

A source of fluid under pressure constituted by a pump 48 and a reservoir 49 has a high-pressure line 16 and a pair of return lines 17 and 18, the pump 48 itself having its inlet connected to the reservoir 49. The plates 11, 12 and 14 are formed with through-going passages 19, 21, and 22 that register with one another and are connected to the high-pressure line 16 and return lines 17 and 18, constituting the low-pressure side of the source. In addition, a shunt line 23 connected in the plate 10 to the high-pressure side 16 passes through the plates 12 and 14 in line.

In the end plate 15 the shunt line 23 is connected via a one-way low-pressure reducing valve 47 to the return line 21. The lines 19 and 22 terminate at the plate 15.

On the plate 11 the line 16 is connected through a medium-pressure reducing valve 25, a filter 26, and a restriction 27 to a line 24 which extends in-line through the plates 12 and 14 and terminates at the end plate 15. In addition, a high-pressure relief valve 28 is connected in the plate 11 directly between the high-pressure side and one return 17. This valve 28 automatically opens when pressure between the sides 16 and 17 exceeds a predetermined maximum so as to limit the pressure differential between these sides to a predetermined high-pressure differential.

The valve plate 12 carries a spool-type valve body 29 normally urged into the illustrated central position with its central portion 31 maintaining the line 23 open so that the valve 47 is connected between the lines 16 and 17. In the one end position its end portion 32 cuts off the line 23 to disconnect the valve 47 and connects the lines 16 and 17 to a pair of output or control lines 34 and 35 which may, for example, be connected as shown to a double-acting cylinder 40. In its other end position, its other end section 33 still interrupts flow through the shunt line 23 but connects the lines 34 and 35 oppositely to the lines 16 and 17 for opposite actuation of the cylinder 40. Springs effective on either ends of the valve body 29 urge it into the illustrated middle position.

The valve body 29 is connected via a rod 36 to a differential piston 37 connected on its other side via a smaller diameter rod 30 to a position sensor 44. The small face of the piston 37 is therefore acted upon by fluid in the chamber 38 continuously connected through a restriction 41 in the plate 13 to the line 24 connected to the outlet of the medium-pressure reducing valve 25. The chamber 39 at the larger piston face is connectable through a solenoid valve 42 to the chamber 38 and is connectable through another solenoid valve 43 to the low-pressure line 18. These valves 42 and 43 are normally urged by respective springs into the illustrated positions, that is, allowing fluid flow from the line 24 through the restriction 41 into the line 18. The controller 45 which receives an actual-value position signal from the unit 44 and a reference-value position signal from a generator 46 can operate either of these valves 42 and 43 to close it.

The large-diameter rod 36 connecting the piston 37 with the valve body 29 is provided with an externally projecting and diagrammatically illustrated handle 20. In addition the other side of the piston 37 is connected via small-diameter rod 30 to the controller 44 so that the effective piston surface area in the chamber 39 is substantially greater than that in the chamber 38.

The device functions as follows:

So long as the reference-value generator 46 is not operating and the controller 45 is not operating either of the valves 42 and 43 the system will be in standby condition with the valve body 29 in the illustrated middle position. The pump 48 will, therefore, draw liquid out of the reservoir 49 and feed it to the high-pressure line 16. This liquid will flow through the shunt conduit 23 and the low-pressure valve 47 back to the reservior 49 through the return line 17. Thus this valve 47 establishes the minimum pressure level in the entire system, this pressure being below the level at which the valve 25 closes so that this pressure is also present in the line 24. In this standby condition both of the chambers 38 and 39 are connected at one side through restrictions 27 and 41 and the valve 25 to the high-pressure line in which the above-mentioned relatively low pressure is present, and in the opposite direction they are directly connected to the low-pressure line 18. Thus, there will be virtually no pressure present in the chambers 38 and 39.

Closing of the valve 42 by operation from the controller 45 will cause the relatively low pressure in the system to become completely effective in the chamber 38, whereas the chamber 39 will remain at substantially zero pressure. This will push the piston 37 to the right and, therefore, pull the valve body 29 also to the right. As soon as the valve body 29 is off its central position, the shunt conduit 23 is interrupted and the pressure in the system will quickly rise to the level established by the valve 25, which is substantially higher than that established by the valve 47. This firmly displaces the piston 37 to the right and applies the pump pressure directly to the control cylinder 40. The high-pressure control valve 28 is effective once the piston of the cylinder 40 has reached the end of its travel to prevent overloading of the pump 48.

Closing of the valve 43 when the system is in standby condition will cause the relatively low pressure in the system to be effective in both of the chambers 38 and 39 and, therefore, will shift the piston 37 to the left as shown in FIG. 1. Once again the shunt conduit 23 will be interrupted and the pressure will quickly rise in the system to the level established by the valve 25 so that the piston 37 will move rapidly to the right and be held in this position. It is noted that the valve 42 and 43 are closed alternately; at no time are they both closed.

It is noted that a plurality of other valve plates 14 may be sandwiched between the valve plate 12 and the end plate 15, these plates 14 being identical to the plates 12 and 13. The restriction 41 in each of the control networks 13 ensures that the operation of the respective control arrangement will not cause a sharp drop in pressure in the system so as to prevent any of the other systems from operating.

Figure 2:
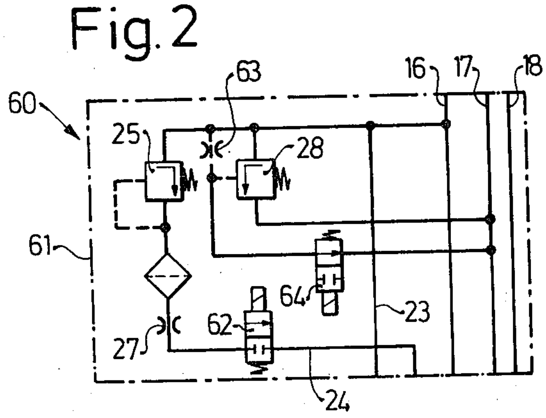
FIG. 2 is a schematic view of an alternate form of a portion of the arrangement of FIG. 1.

It is also possible as shown in FIG. 2 to provide a plate 60 which is identical to the plate 11 and includes the same structure except that here a simple solenoid-operated cutoff valve 62 is provided in the line 24. This valve is normally closed by spring force but can be magnetically operated to open. The valve 62 is controlled by the electronic controller 45 and is only operated when one of the valves 42 or 43 is electrically energized so that when the arrangement is in standby condition the line 24 is interrupted. This prevents a continuous bleed of pressure in the system through the valves 42 and 43 and considerably increases their service life. It also serves to prevent liquid loss when the valves 29 of plates 12 and 14 are operated manually through the handles 20 as this would normally interrupt the line 23 and cause a relatively heavy flow of fluid through the valves 42 and 43.

The system of FIG. 2 also includes a normally open cutoff valve 64 which is connected between the pilot port of the high-pressure valve 28 and the low-pressure line 17. A restriction 63 is provided between this high-pressure port and the high-pressure line 16. When the pump 48 is operating and the valve 29 of plate 12 is not actuated, the solenoid valve 64 in conjunction with the throttle 63 controls the pressure limiting valve 28 in order to feed oil from the pump 48 through the plate 61 directly into the return line 17. This allows the pump to operate against very reduced back pressure and, therefore, have an increased service life.

The valve 25 serves to limit the pressure at its outlet side. Thus the pressure at the outlet side of the valve 25 will never be higher than the above-described medium pressure level. This valve 25 thus closes whenever the pressure at its outlet side exceeds a predetermined medium pressure. The valve 28, however, only opens when the pressure at its inlet side exceeds a predetermined high-pressure level. The valve 47 operates merely to create a predetermined pressure differential in one direction, while completely and always blocking flow in the other direction.

It is also within the scope of the invention to provide instead of the valve 47 in the end plate 15 a one-way valve that is provided in a separate return conduit extending from the end plate back to the reservoir 49.

It will be understood that each of the elements described above, or two or more together, may also find a useful application in other types of structure differing from the types described above.

While the invention has been illustrated and described as embodied in a hydraulic control system, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control system connectible to a pair of output lines, said system comprising:
   - a source of fluid having a high-pressure side and a low-pressure side;
   - means including a low-pressure limiting valve for maintaining a predetermined low-pressure differential between its input and output sides;
   - means including a main valve connected to said lines, said sides, and said low-pressure valve and having a valve body displaceable from an end position for connecting each of said lines to a respective one of said sides and disconnecting said low-pressure valve from one of said sides and another position for disconnecting said lines from said sides and connecting said low-pressure valve across said sides;
   - means including a medium-pressure limiting valve having an input connected to said high-pressure side and an output for maintaining pressure at its output below a predetermined medium-pressure level greater than said low-pressure differential and smaller than the pressure differential between said sides, said low-pressure valve and said medium-pressure valve being connected in parallel across said sides in said other position of said valve body;
   - a differential pilot piston connected to said valve body and jointly displaceable therewith; and
   - pilot-valve means connected between said output of said medium-pressure valve and said pilot piston for hydraulically actuating same and thereby displacing said body between its said positions, said pilot-valve means including a chamber at the smaller face of said piston and connected to said output of said medium-pressure valve, a pair of pilot valves, and a chamber at the larger face of said piston connectable through one of said pilot valves to said low-pressure side and through the other of said pilot valves to the other chamber of said piston.

2. The system defined in claim 1 wherein said valve body has a pair of such end positions, one of said lines being connected to said high-pressure side and the other line to said low-pressure side in one of said end positions and said one line being connected to said low-pressure side and said other line being connected to said high-pressure side in the other of said end positions, said low-pressure valve being disconnected from one of said sides in both of said end positions.

3. The system defined in claim 2 wherein said pilot-valve means is connected directly between said output of said medium-pressure valve and said low-pressure side.

4. The system defined in claim 3, further comprising a flow restriction between said medium-pressure valve and said pilot-valve means.

5. The system defined in claim 4, comprising a middle plate carrying said main valve, a plate connected to said source, to one side of said middle plate, and a plate connected to the other side of said middle plate and carrying said low-pressure valve.

6. The system defined in claim 4 further comprising means including a high-pressure limiting valve connected between said high-pressure and low-pressure sides for maintaining between its input and output a predetermined high-pressure differential greater than said medium-pressure differential and smaller than the pressure differential between said high-pressure and low-pressure sides, cutout means for disconnecting said high-pressure valve from at least one of said sides, and a closable cutoff valve between said medium-pressure valve and one of said sides, and a common plate carrying said high-pressure, medium-pressure, and cutoff valves and said cutout means.

7. A hydraulic control system connectable to a pair of output lines, said system comprising:
   - a source of fluid having a high-pressure side and a low-pressure side;

means including a low-pressure limiting valve for maintaining a predetermined low-pressure differential between its input and output sides;

means including a main valve connected to said lines, said sides, and said low-pressure valve and having a valve body displaceable from an end position for connecting each of said lines to a respective one of said sides and disconnecting said low-pressure valve from one of said sides and another position for disconnecting said lines from said sides and connecting said low-pressure valve across said sides;

means including a medium-pressure limiting valve having an input connected to said high-pressure side and an output for maintaining pressure at its output below a predetermined medium-pressure level greater than said low-pressure differential and smaller than the pressure differential between said sides;

a pilot piston connected to said valve body and jointly displaceable therewith;

pilot-valve means connected between said output of said medium pressure valve and said pilot piston for hydraulically actuating same and thereby displacing said body between its said positions; and means including a high-pressure limiting valve connected between said high-pressure and low-pressure sides for maintaining between its input and output a predetermined high-pressure differential greater than said medium-pressure differential and means for disconnecting said high-pressure valve from at least one of said sides.

* * * * *